US009462630B2

(12) United States Patent
Murray et al.

(10) Patent No.: US 9,462,630 B2
(45) Date of Patent: Oct. 4, 2016

(54) METHOD AND A WIRELESS DEVICE FOR COLLECTING SENSOR DATA FROM A REMOTE DEVICE HAVING A LIMITED RANGE WIRELESS COMMUNICATION CAPABILITY

(75) Inventors: Joseph M. Murray, Schwenksville, PA (US); Jean-Louis Gauvreau, La Prairie (CA); Rocco DiGirolamo, Laval (CA); Kenneth F. Lynch, Wayne, PA (US); Prabhakar R. Chitrapu, Blue Bell, PA (US); Scott C. Hergenhan, Collegeville, PA (US); Robert A. DiFazio, Greenlawn, NY (US)

(73) Assignee: InterDigital Patent Holdings, Inc., Wilmington, DE (US)

( * ) Notice: Subject to any disclaimer, the term of this patent is extended or adjusted under 35 U.S.C. 154(b) by 348 days.

(21) Appl. No.: 12/986,624

(22) Filed: Jan. 7, 2011

(65) Prior Publication Data

US 2011/0252111 A1    Oct. 13, 2011

Related U.S. Application Data

(60) Provisional application No. 61/300,237, filed on Feb. 1, 2010, provisional application No. 61/293,463, filed on Jan. 8, 2010.

(51) Int. Cl.
*G06F 15/16*    (2006.01)
*H04W 84/18*    (2009.01)
(Continued)

(52) U.S. Cl.
CPC ............. *H04W 84/18* (2013.01); *H04W 84/12* (2013.01); *H04W 92/02* (2013.01)

(58) Field of Classification Search
CPC ... F02B 77/085; H04W 24/04; H04W 92/02; H04W 84/18; H04W 84/12; Y02B 60/50; H04L 67/28; H04L 67/025; A61B 2562/0271; A61B 2560/0271
USPC ....... 709/203, 217, 201, 219, 223–224, 249; 715/736
See application file for complete search history.

(56) References Cited

U.S. PATENT DOCUMENTS 6,317,639 B1    11/2001  Hansen
6,847,824 B1 *   1/2005  Contractor ................. 455/456.1
(Continued)

FOREIGN PATENT DOCUMENTS

CN    101262487 A    9/2008
EP    2141953 A2    1/2010
(Continued)

OTHER PUBLICATIONS

Bluetooth Documentation, "Basic Imaging Profile Interoperability Specification", Bluetooth SIG Imaging Working Group, BIP_SP_D10_r01, Jul. 24, 2012, pp. 1-92.
(Continued)

*Primary Examiner* — Oanh Duong
(74) *Attorney, Agent, or Firm* — Condo Roccia Koptiw LLP

(57) ABSTRACT

A device and method for registering devices on advanced networks as well as providing operative communications between a legacy device and a advanced network. The legacy device may contain data, such as sensor data, which is being collected on a network outside the communication range/abilities of the legacy device. An intermediary device may receive the data via a first communication scheme and send the device to a server collecting the data via a second communication scheme.

19 Claims, 7 Drawing Sheets

(51) Int. Cl.
*H04W 84/12* (2009.01)
*H04W 92/02* (2009.01)

(56) References Cited

U.S. PATENT DOCUMENTS

| | | | |
|---|---|---|---|
| 7,971,143 B2* | 6/2011 | Santanche et al. | 715/736 |
| 8,473,631 B2* | 6/2013 | Scherer et al. | 709/232 |
| 2003/0211866 A1* | 11/2003 | Narazaki et al. | 455/561 |
| 2005/0014486 A1 | 1/2005 | Shimizu et al. | |
| 2005/0108523 A1* | 5/2005 | West | 713/165 |
| 2006/0202834 A1* | 9/2006 | Moriwaki | 340/573.1 |
| 2006/0242285 A1* | 10/2006 | Moriwaki | 709/223 |
| 2007/0027367 A1* | 2/2007 | Oliver et al. | 600/300 |
| 2007/0252734 A1* | 11/2007 | Greiner et al. | 341/67 |
| 2007/0282944 A1* | 12/2007 | Odaka et al. | 709/203 |
| 2007/0299956 A1* | 12/2007 | Odaka et al. | 709/223 |
| 2008/0069122 A1* | 3/2008 | Matsuoka et al. | 370/401 |
| 2008/0183245 A1* | 7/2008 | Van Oort et al. | 607/60 |
| 2008/0263150 A1* | 10/2008 | Childers et al. | 709/203 |
| 2008/0307060 A1* | 12/2008 | Okamura | 709/206 |
| 2009/0034591 A1* | 2/2009 | Julian et al. | 375/220 |
| 2009/0064046 A1* | 3/2009 | Childers et al. | 715/835 |
| 2009/0210141 A1* | 8/2009 | Young et al. | 701/119 |
| 2009/0232025 A1* | 9/2009 | Baggott et al. | 370/254 |
| 2009/0292830 A1* | 11/2009 | Nagashima et al. | 710/13 |
| 2010/0087217 A1 | 4/2010 | Lopez De Arroyabe et al. | |
| 2010/0094930 A1* | 4/2010 | Griff et al. | 709/203 |
| 2010/0100307 A1* | 4/2010 | Kim | 701/119 |
| 2012/0047551 A1 | 2/2012 | Pattar et al. | |

FOREIGN PATENT DOCUMENTS

| | | |
|---|---|---|
| JP | 2003-085213 A | 3/2003 |
| JP | 2008-009641 A | 1/2008 |
| JP | 2008-538669 A | 10/2008 |
| KR | 100652336 B1 | 11/2006 |
| KR | 1020060112498 A | 11/2006 |
| WO | WO 2006/111884 A1 | 10/2006 |
| WO | WO-2008027750 A2 | 3/2008 |

OTHER PUBLICATIONS

Fall, Kevin, "A Delay-Tolerant Network Architecture for Challenged Internets", Intel Research, Berkeley, SIGCOMM, Jul. 24, 2003, pp. 8.
Farrell, S. et al., "Licklider Transmission Protocol—Security Extensions", Networking Grouping, RFC 5327, Sep. 2008, 11 pages.
Ramadas, M. et al., "Licklider Transmission Protocol-Specification", Networking Working Group, RFC 5326, Sep. 2008, 54 pages.
Burleigh, S. et al., "Licklider Transmission Protocol—Motivation", Networking Working Group, RFC 5325, Sep. 2008, 23 pages.
Scott, K. et al.,"Bundle Protocol Specification", Networking Working Group, RFC 5050, Nov. 2007, 50 pages.
Cerf, V., "Delay-Tolerant Networking Architecture", Networking Working Group, RFC 4838, Apr. 2007, 35 pages.
Levine, Brian Neil et al., "UMass DieselNet and related projects", University of Massachusetts Amherst, Mar. 19, 2006, 16 pages.
Alex Pentland et al., "DakNet: Rethinking Connectivity in Developing Nations", Jan. 2004, pp. 1-6, IEEE Computer Society.
Juang, Phil et al., "Energy-Efficient Computing for Wildlife Tracking: Design Tradeoffs and Early Experiences with ZebraNet", Princeton University, Tenth Intl. Conference on Architectural Support for Programming Languages and Operating Systems (ASPLOS), Oct. 2002, 12 pages.
Jayaraman, et al., "Sensor Data Collection Using Heterogeneous Mobile Devices", Proceedings of the IEEE International Conference on Pervasive Services, Istanbul, Turkey Jul. 15-20, 2007, pp. 161-164.

* cited by examiner

METHOD AND A WIRELESS DEVICE FOR COLLECTING SENSOR DATA FROM A REMOTE DEVICE HAVING A LIMITED RANGE WIRELESS COMMUNICATION CAPABILITY

CROSS REFERENCE TO RELATED APPLICATIONS

This application claims the benefit of U.S. patent application No. 61/300,237 entitled "METHOD AND APPARATUS FOR DATA PARCEL COMMUNICATION FOR CELLULAR MACHINE-TO-MACHINE APPLICATIONS" filed Feb. 1, 2010, and U.S. patent application No. 61/293,463 entitled "METHOD AND APPARATUS FOR ASSISTED DISCOVERY IN WIRELESS NETWORKS," filed Jan. 8, 2010, the contents of which are hereby incorporated by reference herein.

TECHNICAL FIELD

This application is related to wireless communication systems.

BACKGROUND

Wireless communication devices implement numerous schemes and procedures in order to operatively communicate with other wireless devices. Legacy devices often communicate via legacy communications schemes which may or may not be supported by devices on more advanced networks. Additionally, some remote devices may be power constrained, meaning they cannot transmit beyond a defined communication range based on their maximum transmit power level. Lack of a common communication scheme or transmission power issues may prevent a legacy device from being able to effectively send data or other content to more advanced networks. Moreover, devices contained on the advanced network will often be unaware of the existence of the legacy device since they cannot communicate directly.

An exemplary legacy device can be a Bluetooth enabled device, such as a wireless picture frame. The wireless picture frame can send and/or receive content, such as digital photos, from devices that support Bluetooth communications. In the case of the picture frame, devices that do not support Bluetooth would not be able to publish digital photos to the picture frame, nor would they be able to receive digital photos from the frame. The communication constraints of the legacy device prevent it from being accessible to devices that do not support the legacy communications scheme. For example, a Wi-Fi enabled computer may have photographic content available for the picture frame, but it may not support Bluetooth connectivity. In this case the computer and picture frame would not be able to communicate or share content.

In another example, a legacy device may be a wireless transmitter coupled to a sensor monitoring external stimuli in its general vicinity. For example, a sensor may be monitoring the functionality of a street light to ensure it is in operation during the correct time of day. However, the wireless transmitter coupled to the sensor may be power constrained or may not support a wireless communication scheme that would allow it to send sensor data to a server that aggregates data from that sensor. For example, if the transmitter coupled to the sensor has a maximum transmission distance of only a few meters, a member of the maintenance staff may need to manually check the sensor for sensor data periodically. This requires that a user manually go to the sensor to receive the sensor data transmission, and then send an update to the server with the information manually received from the sensor. The device aggregating the data may be a server located on a network far removed from the location of the sensor and its transmitter, making aggregation of the data time-intensive and requiring a great deal of manual intervention.

It is contemplated that many sensors will have limited transmission power in order to minimize energy usage and could use relatively low-power transmission schema such as Bluetooth, Zigbee, or the like. In this case, a sensor transmitting via a legacy communication scheme may not be able to successfully send the sensor data to its proper destination because the sensor cannot communicate with the destination directly.

SUMMARY

In order to allow for operative communications between legacy devices and devices contained on more advanced networks, systems and methods are disclosed for an intermediary device to facilitate a communication session between the legacy device and the advanced network, typically with little or no manual intervention by a device user. In an exemplary embodiment, a wireless device that supports both the legacy communication scheme and the advanced communications scheme receives registration information from the legacy device and transmits the registration information to a device on the advanced network. The intermediary device may also send data or content from a device on the advanced network to the legacy device.

In the example of the Bluetooth enabled picture frame, the Wi-Fi computer would not be able to send content to the picture frame, for example, because it does not support a Bluetooth connection. However, by introducing an intermediary device that does support both Bluetooth and Wi-Fi, operative communications between the picture frame and the computer can be established. For example, a digital camera may support both Bluetooth and Wi-Fi communication schemes. Upon discovering the legacy picture frame, the camera may contact a Centralized Gateway (CGW) contained on the Wi-Fi network that maintains a listing of devices contained on the Wi-Fi network and the content and/or capabilities of these devices. The camera may then send registration information to the CGW so that the listing can be updated to include the picture frame. The registration information may contain information such as the identification of the picture frame, the content contained on the picture frame, the capabilities of the picture frame, how to contact the picture frame, or the like.

Embodiments contemplate a large number of sensors located in a given geographical region. For instance, a series of sensors may monitor all street lamps in a region, for example the street lamps in a park. The sensors may also be equipped with short-range wireless transmitters in order to transmit data from the sensors to nearby wireless devices. However, the server that collects and maintains sensor data for the street lamps may not support the short-range wireless transmission scheme or it may be outside of the sensors' transmission range. Embodiments contemplate an intermediary device, such as a Wireless Transmit/Receive Unit (WTRU) that supports both the legacy communication scheme and the advanced communication scheme.

For example, the legacy device may support Bluetooth, and it may be discovered by the WTRU while the operator of the WTRU walks through the park. After discovering the legacy device, the WTRU may be programmed to identify the server that collects data from the street lamp sensors based on the identification information of the sensor. The WTRU may then receive sensor data from the legacy device via Bluetooth. The WTRU may then send the data to the server via the advanced communications scheme such as, for example, via a cellular data network. It is also contemplated that the WTRU may store the data for a period of time before sending it to the server. The WTRU may store the data and transmit it at a later time in order to minimize an absolute or relative cost or bandwidth of sending the data to the server. The WTRU may also store the data for a period of time based on a determination that the security level of the wireless connection is not strong enough. The WTRU may store the data based on an instruction received from the server.

Embodiments contemplate numerous WTRUs implementing the method, thereby allowing delivery of numerous data parcels containing sensor data. If a sufficiently large number of WTRUs are operating according to the disclosed system, then as the WTRUs are proliferated across a large geographical area, the coverage range of the system will increase. The probability that a legacy device with data to be delivered will come into contact with an intermediary WTRU will also greatly increase. Embodiments contemplate that WTRUs that are within a geographical vicinity of a device with data may automatically receive the data from the device via the legacy connection, and transmit the data to the server via the advanced connection with insubstantial manual user input. Embodiments also contemplate that a device with data may communicate with the WTRU via a low-power/low-cost connection that is not capable of establishing a link with the destination for the data. In some embodiments, the entire process may be done without any intervention by the operator of the intermediary device.

BRIEF DESCRIPTION OF THE DRAWINGS

A more detailed understanding may be had from the following description, given by way of example in conjunction with the accompanying drawings wherein.

DETAILED DESCRIPTION OF ILLUSTRATIVE EMBODIMENTS

Figure 1A:
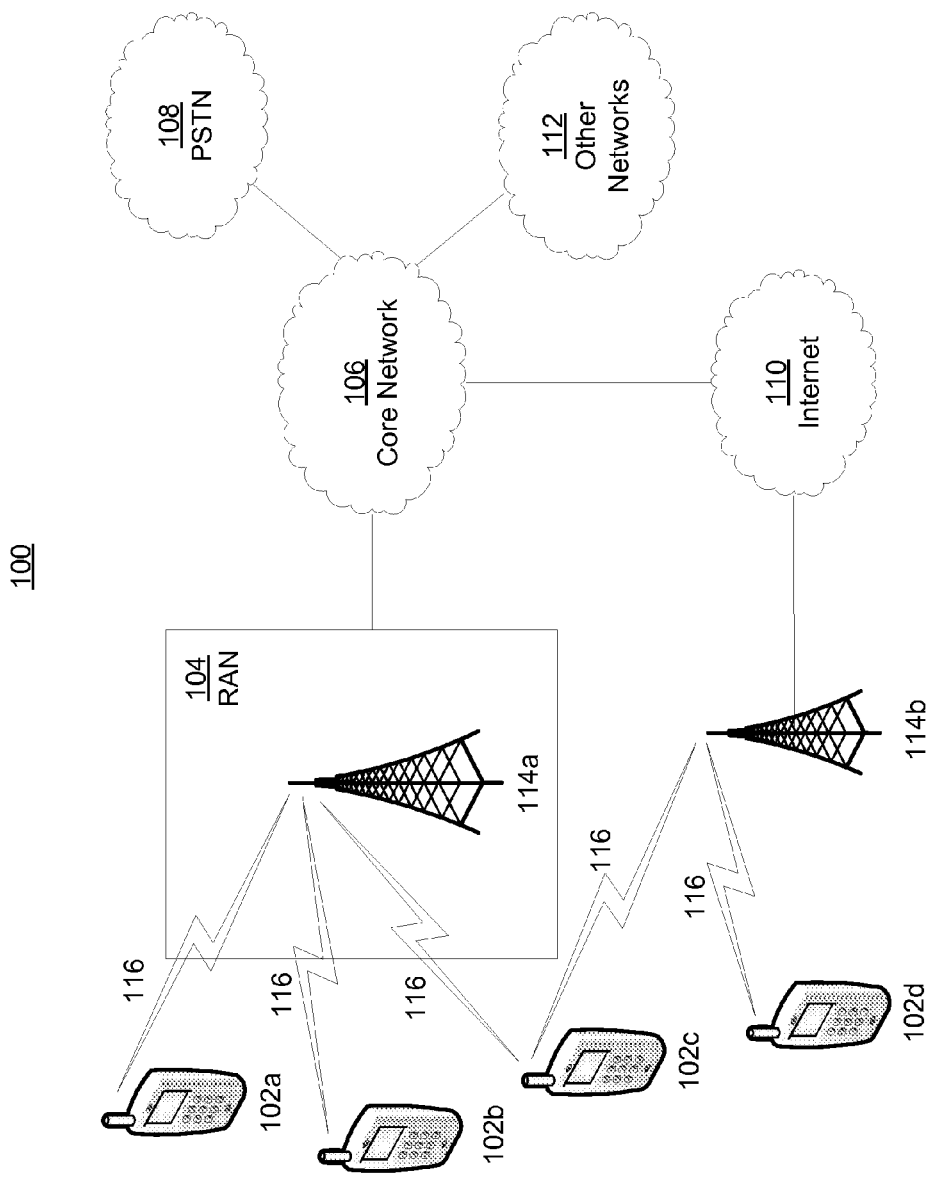
FIG. 1A is a system diagram of an example communications system in which one or more disclosed embodiments may be implemented.

FIG. 1A is a diagram of an example communications system 100 in which one or more disclosed embodiments may be implemented. The communications system 100 may be a multiple access system that provides content, such as voice, data, video, messaging, broadcast, etc., to multiple wireless users. The communications system 100 may enable multiple wireless users to access such content through the sharing of system resources, including wireless bandwidth. For example, the communications systems 100 may employ one or more channel access methods, such as code division multiple access (CDMA), time division multiple access (TDMA), frequency division multiple access (FDMA), orthogonal FDMA (OFDMA), single-carrier FDMA (SC-FDMA), and the like.

As shown in FIG. 1A, the communications system 100 may include wireless transmit/receive units (WTRUs) 102a, 102b, 102c, 102d, a radio access network (RAN) 104, a core network 106, a public switched telephone network (PSTN) 108, the Internet 110, and other networks 112, though it will be appreciated that the disclosed embodiments contemplate any number of WTRUs, base stations, networks, and/or network elements. Each of the WTRUs 102a, 102b, 102c, 102d may be any type of device configured to operate and/or communicate in a wireless environment. By way of example, the WTRUs 102a, 102b, 102c, 102d may be configured to transmit and/or receive wireless signals and may include user equipment (UE), a mobile station, a fixed or mobile subscriber unit, a pager, a cellular telephone, a personal digital assistant (PDA), a smartphone, a laptop, a netbook, a personal computer, a wireless sensor, consumer electronics, and the like.

The communications systems 100 may also include a base station 114a and a base station 114b. Each of the base stations 114a, 114b may be any type of device configured to wirelessly interface with at least one of the WTRUs 102a, 102b, 102c, 102d to facilitate access to one or more communication networks, such as the core network 106, the Internet 110, and/or the networks 112. By way of example, the base stations 114a, 114b may be a base transceiver station (BTS), a Node-B, an eNode B, a Home Node B, a Home eNode B, a site controller, an access point (AP), a wireless router, and the like. While the base stations 114a, 114b are each depicted as a single element, it will be appreciated that the base stations 114a, 114b may include any number of interconnected base stations and/or network elements.

The base station 114a may be part of the RAN 104, which may also include other base stations and/or network elements (not shown), such as a base station controller (BSC), a radio network controller (RNC), relay nodes, etc. The base station 114a and/or the base station 114b may be configured to transmit and/or receive wireless signals within a particular geographic region, which may be referred to as a cell (not shown). The cell may further be divided into cell sectors. For example, the cell associated with the base station 114a may be divided into three sectors. Thus, in an embodiment, the base station 114a may include three transceivers, i.e., one for each sector of the cell. In another embodiment, the base station 114a may employ multiple-input multiple output (MIMO) technology and, therefore, may utilize multiple transceivers for each sector of the cell.

The base stations 114a, 114b may communicate with one or more of the WTRUs 102a, 102b, 102c, 102d over an air interface 116, which may be any suitable wireless communication link (e.g., radio frequency (RF), microwave, infrared (IR), ultraviolet (UV), visible light, etc.). The air interface 116 may be established using any suitable radio access technology (RAT).

More specifically, as noted above, the communications system 100 may be a multiple access system and may employ one or more channel access protocols, such as CDMA, TDMA, FDMA, OFDMA, SC-FDMA, and the like. For example, the base station 114a in the RAN 104 and the WTRUs 102a, 102b, 102c may implement a radio technology such as Universal Mobile Telecommunications System (UMTS) Terrestrial Radio Access (UTRA), which may establish the air interface 116 using wideband CDMA (WCDMA). WCDMA may include communication protocols such as High-Speed Packet Access (HSPA) and/or Evolved HSPA (HSPA+). HSPA may include High-Speed Downlink Packet Access (HSDPA) and/or High-Speed Uplink Packet Access (HSUPA).

In another embodiment, the base station 114a and the WTRUs 102a, 102b, 102c may implement a radio technology such as Evolved UMTS Terrestrial Radio Access (E-UTRA), which may establish the air interface 116 using Long Term Evolution (LTE) and/or LTE-Advanced (LTE-A).

In other embodiments, the base station 114a and the WTRUs 102a, 102b, 102c may implement radio technologies such as IEEE 802.16 (i.e., Worldwide Interoperability for Microwave Access (WiMAX)), CDMA2000, CDMA2000 1x, CDMA2000 EV-DO, Interim Standard 2000 (IS-2000), Interim Standard 95 (IS-95), Interim Standard 856 (IS-856), Global System for Mobile communications (GSM), Enhanced Data rates for GSM Evolution (EDGE), GSM EDGE (GERAN), and the like.

The base station 114b in FIG. 1A may be a wireless router, Home Node B, Home eNode B, or access point, for example, and may utilize any suitable RAT for facilitating wireless connectivity in a localized area, such as a place of business, a home, a vehicle, a campus, and the like. In an embodiment, the base station 114b and the WTRUs 102c, 102d may implement a radio technology such as IEEE 802.11 to establish a wireless local area network (WLAN). In another embodiment, the base station 114b and the WTRUs 102c, 102d may implement a radio technology such as IEEE 802.15 to establish a wireless personal area network (WPAN). In yet another embodiment, the base station 114b and the WTRUs 102c, 102d may utilize a cellular-based RAT (e.g., WCDMA, CDMA2000, GSM, LTE, LTE-A, etc.) to establish a picocell or femtocell. As shown in FIG. 1A, the base station 114b may have a direct connection to the Internet 110. Thus, the base station 114b may not be required to access the Internet 110 via the core network 106.

The RAN 104 may be in communication with the core network 106, which may be any type of network configured to provide voice, data, applications, and/or voice over internet protocol (VoIP) services to one or more of the WTRUs 102a, 102b, 102c, 102d. For example, the core network 106 may provide call control, billing services, mobile location-based services, pre-paid calling, Internet connectivity, video distribution, etc., and/or perform high-level security functions, such as user authentication. Although not shown in FIG. 1A, it will be appreciated that the RAN 104 and/or the core network 106 may be in direct or indirect communication with other RANs that employ the same RAT as the RAN 104 or a different RAT. For example, in addition to being connected to the RAN 104, which may be utilizing an E-UTRA radio technology, the core network 106 may also be in communication with another RAN (not shown) employing a GSM radio technology.

The core network 106 may also serve as a gateway for the WTRUs 102a, 102b, 102c, 102d to access the PSTN 108, the Internet 110, and/or other networks 112. The PSTN 108 may include circuit-switched telephone networks that provide plain old telephone service (POTS). The Internet 110 may include a global system of interconnected computer networks and devices that use common communication schemes, such as the transmission control protocol (TCP), user datagram protocol (UDP) and the internet protocol (IP) in the TCP/IP internet protocol suite. The networks 112 may include wired or wireless communications networks owned and/or operated by other service providers. For example, the networks 112 may include another core network connected to one or more RANs, which may employ the same RAT as the RAN 104 or a different RAT.

Some or all of the WTRUs 102a, 102b, 102c, 102d in the communications system 100 may include multi-mode capabilities, i.e., the WTRUs 102a, 102b, 102c, 102d may include multiple transceivers for communicating with different wireless networks over different wireless links. For example, the WTRU 102c shown in FIG. 1A may be configured to communicate with the base station 114a, which may employ a cellular-based radio technology, and with the base station 114b, which may employ an IEEE 802 radio technology.

Figure 1B:
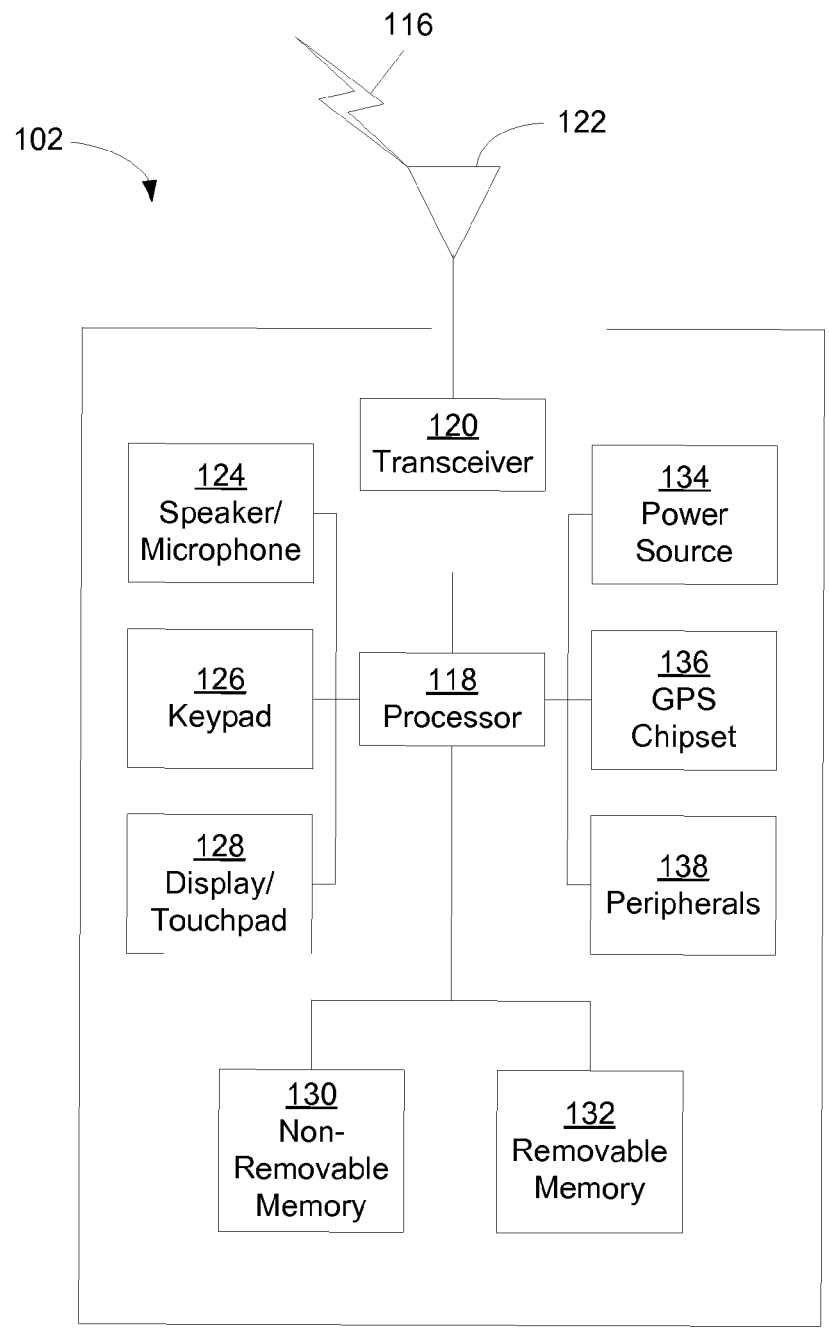
FIG. 1B is a system diagram of an example wireless transmit/receive unit (WTRU) that may be used within the communications system illustrated in FIG. 1A.

FIG. 1B is a system diagram of an example WTRU 102. As shown in FIG. 1B, the WTRU 102 may include a processor 118, a transceiver 120, a transmit/receive element 122, a speaker/microphone 124, a keypad 126, a display/touchpad 128, non-removable memory 130, removable memory 132, a power source 134, a global positioning system (GPS) chipset 136, and other peripherals 138. It will be appreciated that the WTRU 102 may include any sub-combination of the foregoing elements while remaining consistent with an embodiment.

The processor 118 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Array (FPGAs) circuits, any other type of integrated circuit (IC), a state machine, and the like. The processor 118 may perform signal coding, data processing, power control, input/output processing, and/or any other functionality that enables the WTRU 102 to operate in a wireless environment. The processor 118 may be coupled to the transceiver 120, which may be coupled to the transmit/receive element 122. While FIG. 1B depicts the processor 118 and the transceiver 120 as separate components, it will be appreciated that the processor 118 and the transceiver 120 may be integrated together in an electronic package or chip.

The transmit/receive element 122 may be configured to transmit signals to, or receive signals from, a base station (e.g., the base station 114a) over the air interface 116. For example, in an embodiment, the transmit/receive element 122 may be an antenna configured to transmit and/or receive RF signals. In another embodiment, the transmit/receive element 122 may be an emitter/detector configured to transmit and/or receive IR, UV, or visible light signals, for example. In yet another embodiment, the transmit/receive element 122 may be configured to transmit and receive both RF and light signals. It will be appreciated that the transmit/receive element 122 may be configured to transmit and/or receive any combination of wireless signals.

In addition, although the transmit/receive element 122 is depicted in FIG. 1B as a single element, the WTRU 102 may include any number of transmit/receive elements 122. More specifically, the WTRU 102 may employ MIMO technology. Thus, in an embodiment, the WTRU 102 may include two or more transmit/receive elements 122 (e.g., multiple antennas) for transmitting and receiving wireless signals over the air interface 116.

The transceiver 120 may be configured to modulate the signals that are to be transmitted by the transmit/receive element 122 and to demodulate the signals that are received by the transmit/receive element 122. As noted above, the WTRU 102 may have multi-mode capabilities. Thus, the transceiver 120 may include multiple transceivers for enabling the WTRU 102 to communicate via multiple RATs, such as UTRA and IEEE 802.11, for example.

The processor 118 of the WTRU 102 may be coupled to, and may receive user input data from, the speaker/microphone 124, the keypad 126, and/or the display/touchpad 128 (e.g., a liquid crystal display (LCD) display unit or organic light-emitting diode (OLED) display unit). The processor 118 may also output user data to the speaker/microphone 124, the keypad 126, and/or the display/touchpad 128. In addition, the processor 118 may access information from, and store data in, any type of suitable memory, such as the non-removable memory 130 and/or the removable memory 132. The non-removable memory 130 may include random-access memory (RAM), read-only memory (ROM), a hard disk, or any other type of memory storage device. The removable memory 132 may include a subscriber identity module (SIM) card, a memory stick, a secure digital (SD) memory card, and the like. In other embodiments, the processor 118 may access information from, and store data in, memory that is not physically located on the WTRU 102, such as on a server or a home computer (not shown).

The processor 118 may receive power from the power source 134, and may be configured to distribute and/or control the power to the other components in the WTRU 102. The power source 134 may be any suitable device for powering the WTRU 102. For example, the power source 134 may include one or more dry cell batteries (e.g., nickel-cadmium (NiCd), nickel-zinc (NiZn), nickel metal hydride (NiMH), lithium-ion (Li-ion), etc.), solar cells, fuel cells, and the like.

The processor 118 may also be coupled to the GPS chipset 136, which may be configured to provide location information (e.g., longitude and latitude) regarding the current location of the WTRU 102. In addition to, or in lieu of, the information from the GPS chipset 136, the WTRU 102 may receive location information over the air interface 116 from a base station (e.g., base stations 114a, 114b) and/or determine its location based on the timing of the signals being received from two or more nearby base stations. It will be appreciated that the WTRU 102 may acquire location information by way of any suitable location-determination method while remaining consistent with an embodiment.

The processor 118 may further be coupled to other peripherals 138, which may include one or more software and/or hardware modules that provide additional features, functionality and/or wired or wireless connectivity. For example, the peripherals 138 may include an accelerometer, an e-compass, a satellite transceiver, a digital camera (for photographs or video), a universal serial bus (USB) port, a vibration device, a television transceiver, a hands free headset, a Bluetooth® module, a frequency modulated (FM) radio unit, a digital music player, a media player, a video game player module, an Internet browser, and the like.

Figure 1C:
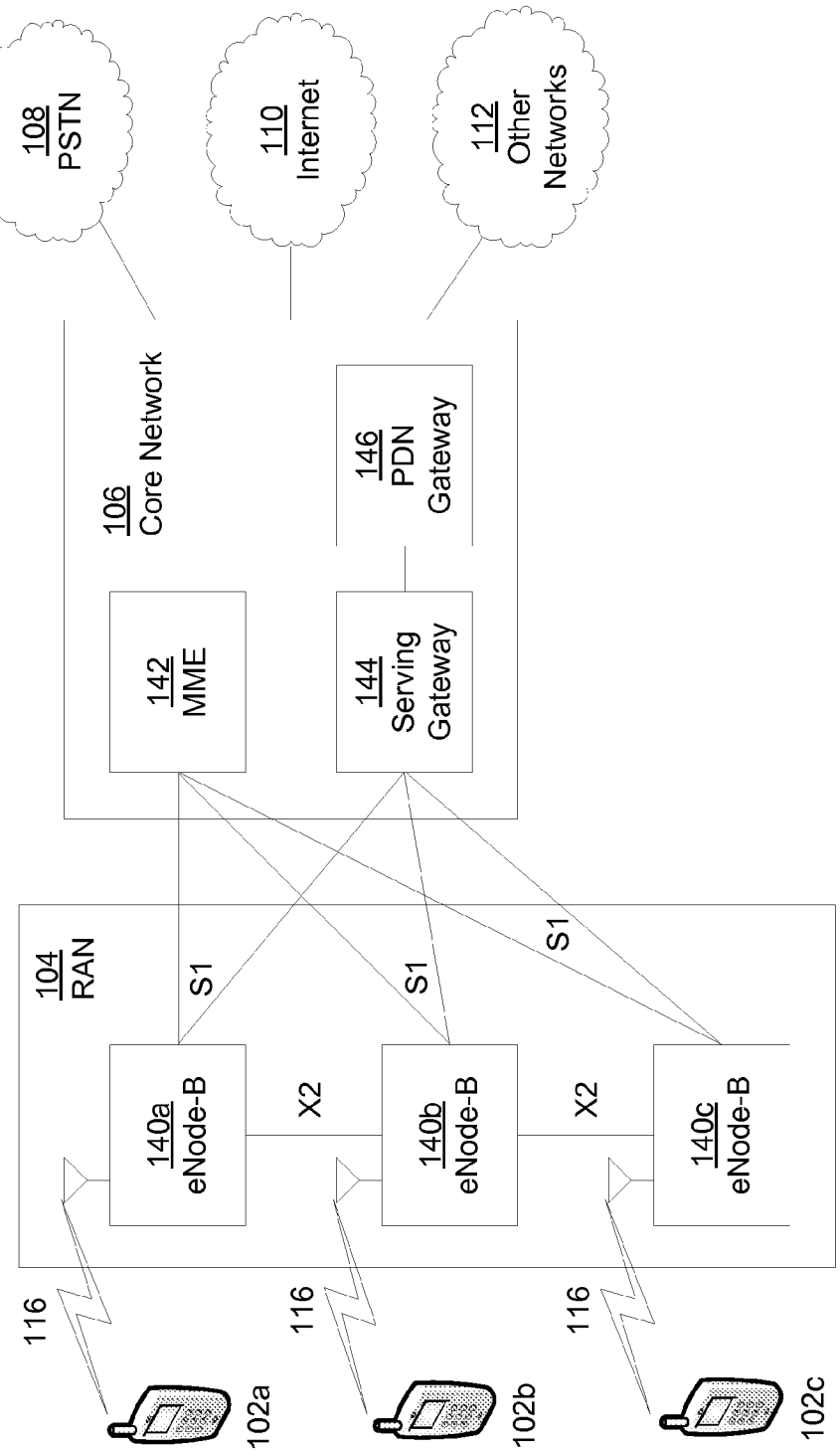
FIG. 1C is a system diagram of an example radio access network and an example core network that may be used within the communications system illustrated in FIG. 1A.

FIG. 1C is a system diagram of the RAN 104 and the core network 106 according to an embodiment. As noted above, the RAN 104 may employ an E-UTRA radio technology to communicate with the WTRUs 102a, 102b, 102c over the air interface 116. The RAN 104 may also be in communication with the core network 106.

The RAN 104 may include eNode-Bs 140a, 140b, 140c, though it will be appreciated that the RAN 104 may include any number of eNode-Bs while remaining consistent with an embodiment. The eNode-Bs 140a, 140b, 140c may each include one or more transceivers for communicating with the WTRUs 102a, 102b, 102c over the air interface 116. In one embodiment, the eNode-Bs 140a, 140b, 140c may implement MIMO technology. Thus, the eNode-B 140a, for example, may use multiple antennas to transmit wireless signals to, and receive wireless signals from, the WTRU 102a.

Each of the eNode-Bs 140a, 140b, 140c may be associated with a particular cell (not shown) and may be configured to handle radio resource management decisions, handover decisions, scheduling of users in the uplink and/or downlink, and the like. As shown in FIG. 1C, the eNode-Bs 140a, 140b, 140c may communicate with one another over an X2 interface.

The core network 106 shown in FIG. 1C may include a mobility management gateway (MME) 142, a serving gateway 144, and a packet data network (PDN) gateway 146. While each of the foregoing elements are depicted as part of the core network 106, it will be appreciated that any one of these elements may be owned and/or operated by an entity other than the core network operator.

The MME 142 may be connected to each of the eNode-Bs 142a, 142b, 142c in the RAN 104 via an S1 interface and may serve as a control node. For example, the MME 142 may be responsible for authenticating users of the WTRUs 102a, 102b, 102c, bearer activation/deactivation, selecting a particular serving gateway during an initial attach of the WTRUs 102a, 102b, 102c, and the like. The MME 142 may also provide a control plane function for switching between the RAN 104 and other RANs (not shown) that employ other radio technologies, such as GSM or WCDMA.

The serving gateway 144 may be connected to each of the eNode Bs 140a, 140b, 140c in the RAN 104 via the S1 interface. The serving gateway 144 may generally route and forward user data packets to/from the WTRUs 102a, 102b, 102c. The serving gateway 144 may also perform other functions, such as anchoring user planes during inter-eNode B handovers, triggering paging when downlink data is available for the WTRUs 102a, 102b, 102c, managing and storing contexts of the WTRUs 102a, 102b, 102c, and the like.

The serving gateway 144 may also be connected to the PDN gateway 146, which may provide the WTRUs 102a, 102b, 102c with access to packet-switched networks, such as the Internet 110, to facilitate communications between the WTRUs 102a, 102b, 102c and IP-enabled devices.

The core network 106 may facilitate communications with other networks. For example, the core network 106 may provide the WTRUs 102a, 102b, 102c with access to circuit-switched networks, such as the PSTN 108, to facilitate communications between the WTRUs 102a, 102b, 102c and traditional land-line communications devices. For example, the core network 106 may include, or may communicate with, an IP gateway (e.g., an IP multimedia subsystem (IMS) server) that serves as an interface between the core network 106 and the PSTN 108. In addition, the core network 106 may provide the WTRUs 102a, 102b, 102c with access to the networks 112, which may include other wired or wireless networks that are owned and/or operated by other service providers.

Figure 2:
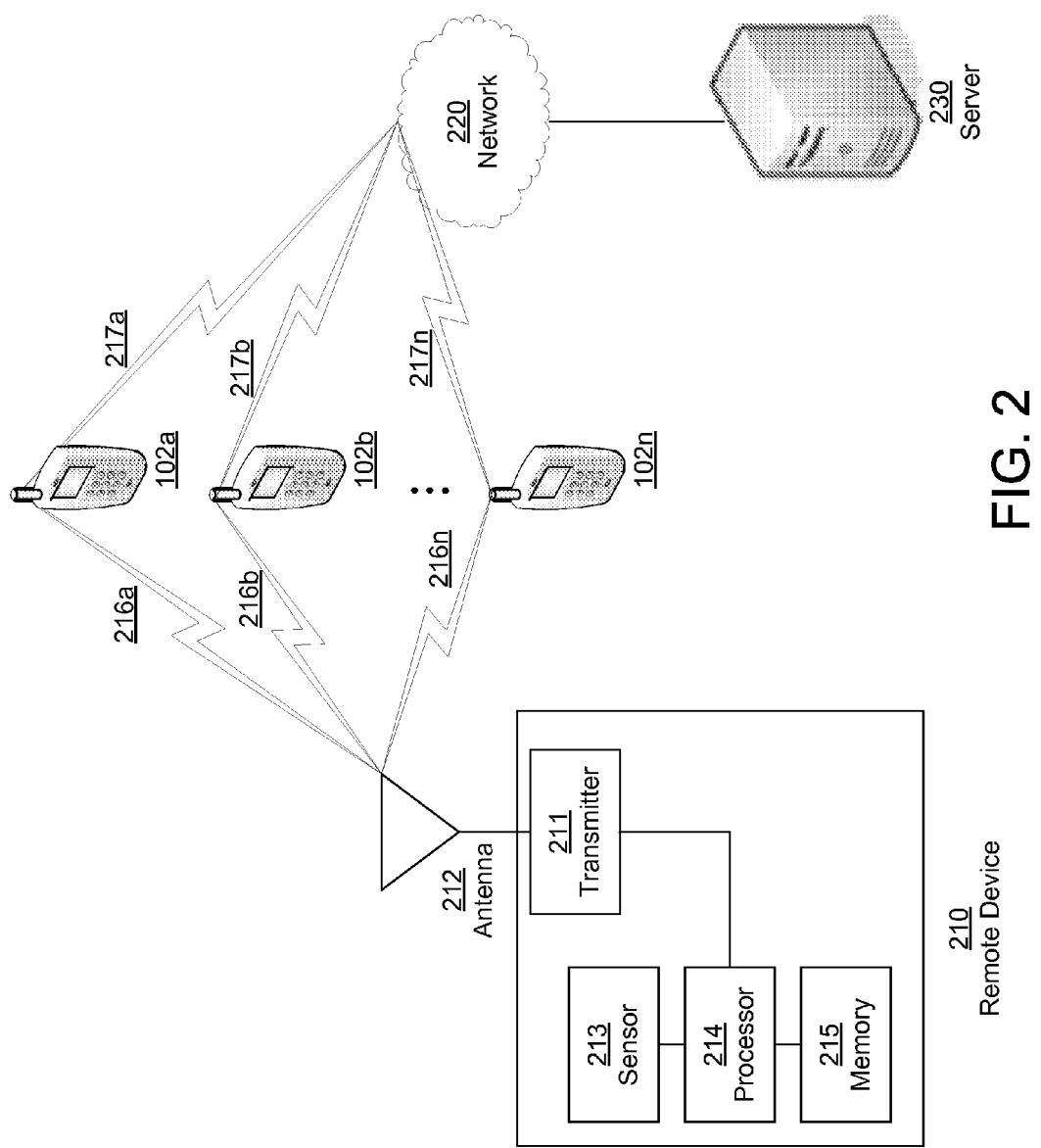
FIG. 2 is a system diagram of an example system in which one or more disclosed embodiments may be implemented.

FIG. 2 depicts an exemplary system capable of implementing illustrative embodiments. Remote device 210 may be any device capable of communicating, generating and/or transmitting data. Remote device 210 may be equipped with antenna 212, which is coupled to transmitter 211 for sending wireless transmissions, for example to WTRU 102. Transmitter 211 may be controlled by processor 214. Processor 214 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Array (FPGAs) circuits, any other type of integrated circuit (IC), a state machine, and the like. The processor 214 may perform signal coding, data processing, power control, input/output processing, and/or any other functionality that enables functioning of remote device 210. While FIG. 2 depicts the processor 214 and the transmitter 211 as separate components, it will be appreciated that the processor 214 and the transmitter 211 may be integrated together in an electronic package or chip.

Processor 214 may execute instructions stored on a tangible computer readable medium that describe the operation of remote device 210. The instructions may be stored on memory 215. Memory 215 may be any tangible component, system, or subsystem suitable for storing data or instructions. Memory 215 may be volatile memory such as Random Access Memory (RAM) or non-volatile memory such as Read-Only Memory (ROM), flash memory, magnetic storage, and the like. In an embodiment, remote device 210 is a transmit-only device. In another embodiment, remote device 210 may also include a receiver coupled to antenna 212 and processor 214 in order to receive wireless communications.

Remote device 210 may also include sensor 213. Sensor 213 may be any device capable of detecting stimuli such as movement, light, heat, temperature, voltage, power, pressure, the presence or absence of a substance, change in conditions or the like. Sensor 213 may be an active device or passive device such as a passive radio frequency identification (RFID) device. In an exemplary embodiment, sensor 213 may detect light in order to determine whether a bulb in a street lamp has burnt out. One skilled in the art will recognize that sensor 213 can monitor a great multitude of stimuli, and could operate under an number of possible conditions. It could be physically separated from, but in operable communication with, remote device 210. Alternatively, it could be housed within remote device 210.

Remote device 210 may be monitoring a number of devices to ensure proper operation. For example remote device 210 may monitoring vending machines, parking meters, utility meters, street light failure detectors, etc. Remote device 210 may be in a fixed location or may be transitory such as on a bus, car, train, airplane, person, package, animal, etc.

Remote device 210 may also be able to transmit to WTRU 102a, WTRU 102b, . . . , WTRU 102n via communication link 216a, 216b, . . . , 216n. Embodiments contemplate numerous WTRUs capable of receiving data parcels from remote device 210 represented by WTRU 102a, WTRU 102b, . . . , WTRU 102n (WTRU 102) in FIG. 2. Communication link 216 may be any type of communication scheme by which remote device 212 may send data parcels to WTRU 102. For example communication link 216 may be Wi-Fi that implements an IEEE 802.11 scheme. In another embodiment, communication link 216 may be Bluetooth. Communication link 216 could be a one directional link, allowing remote device 210 to unilaterally send data to WTRU 102 or a two directional link, allowing communication in either direction between remote device 210 and WTRU 102.

WTRU 102a, WTRU 102b, . . . , WTRU 102n are also in communication with server 230 via network 220 and communication links 217a, 217b, . . . , 217n. For example, WTRU 102 may connect to network 220 via the communications system 100 depicted in FIG. 1A. Alternatively, WTRU 102 may connect to network 220 via a Wi-Fi connection or other type of wireless communication scheme. WTRU 102 may connect to network 220 via the internet or via a private connection. Server 230 may be any device that collects or maintains data from remote device 210. Server 230 may contain memory for storing data such as RAM, ROM, flash memory, magnetic storage, and the like. Server 230 may also contain a communications interface for example via a web server.

Figure 3:
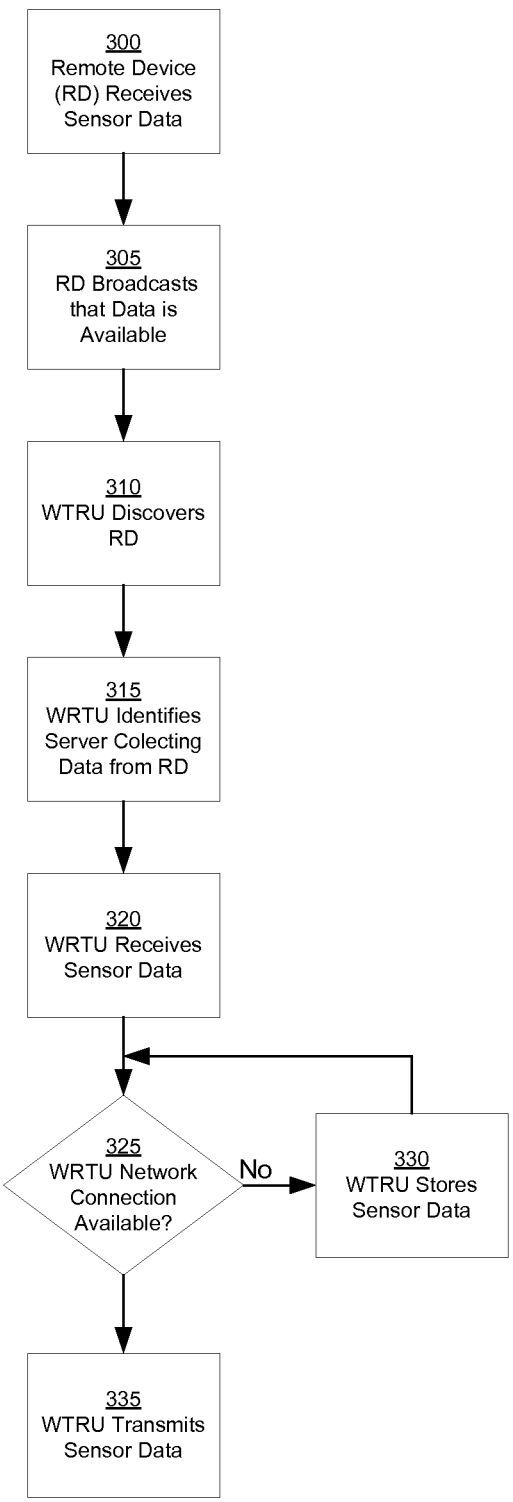
FIG. 3 is a flow chart of an example method of carrying one or more disclosed embodiments.

FIG. 3 is a flowchart of an exemplary method for implementing an illustrative embodiment in the system described in FIG. 2. At 300, sensor 213 on the remote device 210 receives a stimuli that generates sensor data. Remote device 210 may generate sensor data continuously, at predetermined intervals, in response to a stimulus and/or at random intervals. Remote device 210 may store the sensor data in memory 215 or may immediately transmit the data via transmitter 211 and antenna 212. Remote device 210 identifies server 230 as the destination for the sensor data, however, remote device 210 may not be able to communicate directly with the server 230. This may be because remote device 210 does not share an operative communication scheme with server 230. Remote device 210 may not be able to communicate with server 230 because it is a low power device and server 230 is out of range. Server 230 may only be accessible via network 220, and remote device 210 may not be able to access network 220.

At 305, remote device 210 broadcasts that data is available. The broadcast may be directed to specific devices, to groups of devices, to specific types of devices, to devices with certain subscriptions, to devices running specific applications, to all devices, etc. In an embodiment, remote device 210 may be a transmit-only device, so it will transmit data parcels containing the sensor data, not knowing if it was received by WTRU 102. In this case WTRU 102 will discover remote device 102 at 310 by receiving a data parcel via communication link 216. Alternatively, remote device may be equipped with a receiver so that it can both send and receive over communication link 216.

In yet another embodiment, remote device 210 has the capability of receiving control signals over communication link 216 for establishing operative communications with WTRU 102 such as through a handshake scheme. In this case remote device 210 may communicate data unilaterally; e.g., remote device 210 sends data to WTRU 102 but WTRU 102 may not send data to remote device 102, although WTRU 102 may still send control signals to remote device 102 for establishing a communication session. Remote device 210 may also search for a WTRU in the vicinity prior to broadcasting that data is available, for example by detecting radio transmissions by a WTRU. In another example, remote device 210 may be equipped with a motion detector to determine when a passerby with WTRU 102 comes within its general vicinity. WTRU 102 may also actively or passively search for remote device 210.

Remote device 210 may also adapt the rate at which it broadcasts data parcels or indications that data is available in order to conserve power, memory or other resources. Typically, low amounts of residual power and/or memory would reduce the frequency of data parcel transmission. Additionally, remote device may include indications of its current resource, e.g., power/memory remaining in data to be sent to server 230. In another embodiment, remote device WTRU 102 can conserve power and other resources by looking for a broadcast from remote device 210 in areas where a remote device is known to operate.

At 310, WTRU 102 discovers remote device 210 by receiving the broadcast signal indicating that it has data ready to be sent to server 230 from remote device 102. In an exemplary embodiment, WTRU 102 will receive the broadcast at 310, and establish communication link 216, for instance via a handshake. For example, Bluetooth devices may pair with each other prior to exchanging data. After discovering remote device 210, at 315 WTRU 102 may identify server 230 that collects data from remote device 210. For example, WTRU 102 may be running an application that uses the identification information of remote device 210 to determine the server 230 that collects the data. In another example, WTRU 102 may identify the server based on an identification information of sensor 213. Alternatively, WTRU 102 may identify server 230 based on the data included in the transmission from remote device 210.

At 320, WTRU 102 receives sensor data from remote device 210. It can be appreciated that the order of 315 and 320 may be interchangeable, as WRTU 102 may identify server 230 prior to, in the course of, or after receiving data. In an embodiment, remote device 210 may be a transmit-only device, and WTRU 102 may identify remote device 210 based on a received data parcel. The data sent from remote device 210 to WTRU 102 is sent via communications link 216. In an embodiment, the data is sent via Bluetooth or other lower power wireless communications schemes.

At 325, WTRU 102 determines if a network connection is available to send the data received from remote device 210 to server 230. If no connection is available, for instance the WTRU is outside if its service range, then at 330 WTRU 102 stores the sensor data so that it can be sent to server 230 at a later time. Alternatively, even if a network connection is available when WTRU 102 receives the data parcel from remote device 210, it may still store the sensor data for later transmission. For example, WTRU 102 may store the data for a length of time based on an absolute or relative cost, security, or bandwidth of sending the second data parcel to server 230. The decision whether or not to store the data, or for how long to store the data may be made in order to minimize a particular metric. For example cost (i.e., price) of transmitting the packet, required bandwidth, transmit power, etc. In an embodiment, WTRU 102 may limit transmission to occur at or near a certain locations, or in a lightly loaded cell or sector. The metrics or other transmission rules may be chosen to achieve particular WTRU or network objectives; for example, to avoid quickly draining the battery of the WTRU, or to minimize network congestion or access the network during off peak hours. The WTRU may also save the data in order to transmit at typically underutilized locations or near a collection point designed or optimized for collection of the packets.

At 325, if a connection is available, then at 335 WTRU 102 transmits the data to server 230. WTRU 102 may send the data automatically, or it may require approval from its owner in order to transmit the data parcel. For example, WTRU 102 may connect to the internet via a cellular data network in order to send the data. In another embodiment, it may send the data to server 230 via Short Message Service (SMS). In yet another embodiment, WTRU 102 may send the data parcel to server 230 via a WiFi connection over the Internet via an IP or UDP scheme or the like. It can be appreciated that there are numerous other similar schemes for sending the data from WTRU 102 to server 230.

It can also be appreciated that although the embodiments depicted in FIGS. 2 and 3 make use of WTRU 102 for receiving the data parcel from remote device 102 and sending a data parcel to server 230, any device capable of operable communications between both remote device 210 and server 230 could be used. Embodiments contemplate numerous WTRUs, represented by WTRU 102a, WTRU 102b, . . . , WTRU 102n in FIG. 2, implementing the method described above. Remote device 210 may broadcast data to more than one WTRU 102, and redundant transmissions may be necessary to ensure delivery to server 230. After receiving the data parcel containing the sensor data, server 230 may then update a database containing sensor information. Subscribers or sensor owners may then access the database in order to view or download the sensor data. Server 230 may also send the data directly to sensor owners upon delivery of the data from WTRU 102. Additionally, server 230 may act as a web server and make the sensor data available over the internet. In addition to the sensor data, server 230 may also store identification information for WTRU 102 and/or remote device 210 in order to develop billing information for the system. Server 230 may also control access to previously reported sensor data.

Embodiments contemplate numerous types of implementations on WTRU 102. In an embodiment the owner of WTRU 102 may be unaware that WTRU 102 has received data from remote device 210 and/or sent a data to server 230. The system may also be designed to automatically delete older data parcels that may be stored on WTRU 102. In another embodiment, WTRU 102 may provide notifications indicating that it has received or sent data, for example to the WTRU owner via a display or sound, or to remote device 210 via a reply transmission. WTRU 102 may also receive an acknowledgement from server 230 indicating that a data parcel has been successfully delivered to server 230. Server 230 may also send WTRU 102 a listing of other remote devices in its geographical vicinity. Server 230 may also send WTRU 102 a message or instructions to be delivered from WTRU 102 to remote device 210. The instructions may be in response to the reception of sensor data from remote device 210 or based on a recognition that WTRU 102 is in the same geographical vicinity as remote device 210. Server 230 may also maintain a history of the identification information of WTRU 102 that has received data from remote device 210. Server 230 may use the history to recognize which WTRU 102 most often makes contact with remote device 102

Figure 4:
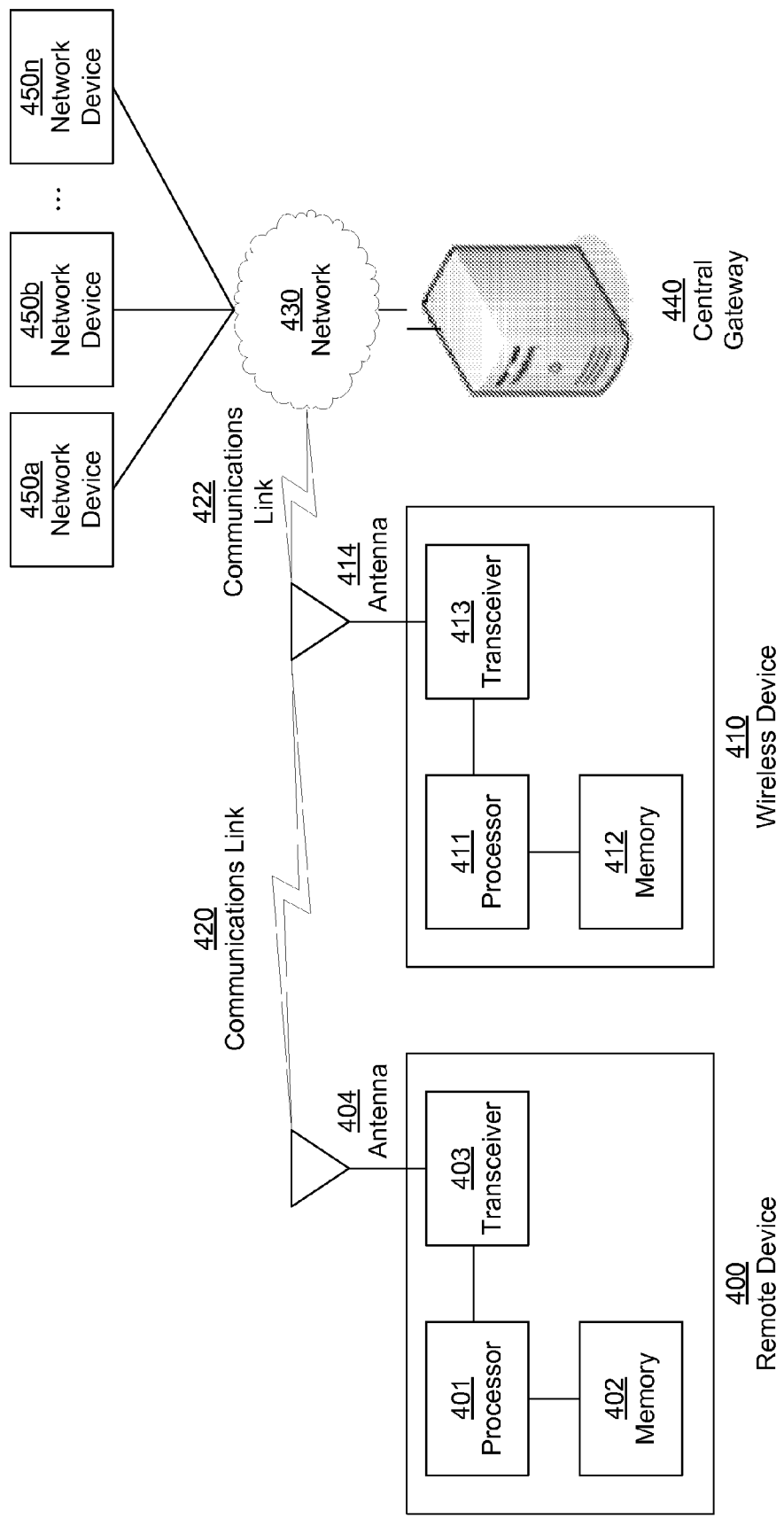
FIG. 4 is a system diagram of an example system in which one or more disclosed embodiments may be implemented.

FIG. 4 depicts an exemplary system capable of implementing illustrative embodiments. Remote device 400 may be a device with data, content, processing capabilities or other information that could be utilized by network device 450a, network device 450b, . . . , network device 450n (network device 450) contained on network 430. However, remote device 400 may not be capable of communicating directly with network device 450. FIG. 4 is an operative communication system for registering remote device 400 with Central Gateway (CGW) 440, which maintains a listing of devices and content available on network 430, thereby making remote device available to network device 450.

Remote device 400 may include transceiver 403 coupled to antenna 404 for operative wireless communications via communications link 420. Remote device 400 may also include processor 401 for controlling transceiver 403. Processor 401 may also access memory 402 which may contain data and/or instructions to be executed by processor 401. Embodiments contemplate remote device 400 being unable to communicate directly with network 430. For example, remote device 400 may be a legacy device with a legacy communication interface not supported by network 430. An exemplary legacy communication interface may be Bluetooth. In other embodiments, remote device 400 may be unable to communicate with network 400 because remote device 400 is outside of the range of network 430 or is located in a region with poor network coverage despite sharing a common communication scheme. In an embodiment, remote device 400 may be power constrained and does not have enough transmission power to close the reverse link with network 430.

Wireless device 410 may be capable of communicating with both remote device 400 and network 430. Wireless device 410 may include transceiver 413 coupled to antenna 414 for operative wireless communications via communications link 420 and/or communications link 422. Wireless device 410 may also include processor 411 for controlling transceiver 413. Processor 411 may also access memory 412 which may contain data and/or instructions to be executed by processor 411. For example, wireless device 410 may be WTRU 102. In another example wireless device 102 may be any device capable of operative communications with both remote device 400 and network 430.

Network 430 contains numerous other devices with a variety of content and processing capabilities. For example, network device 450 may be a personal computer, a WTRU, a printer, a router, a server, a camera, or any other device capable of communications with network 430. Network 430 also contains CGW 440 which maintains a listing of the identification, content, and/or capabilities of all devices contained on network 430. CGW 440 may include a logical entity such as Content and Services Database (CSD) for maintaining a listing of registration information for devices accessible by elements of network 430. The listing contained on the CSD may contain a device's capabilities, network address, location, content stored on the device, content requests by the device, addressing information for wireless device 410 which is necessary to contact remote device 400, or the like. CGW 440 may be accessible to all or a portion of the network devices 450.

Figure 5:
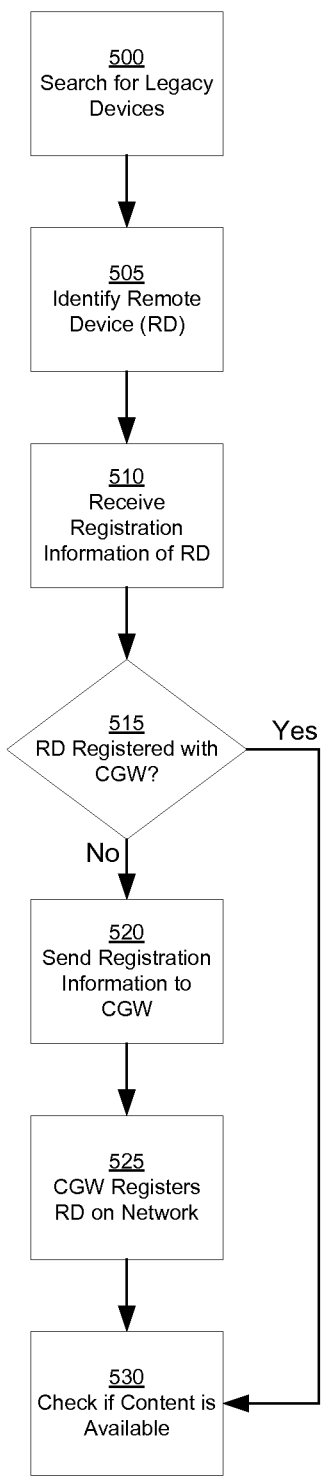
FIG. 5 is a flow chart of an example method of carrying one or more disclosed embodiments.

FIG. 5 is a flowchart of an exemplary method implementing an embodiment on the system disclosed by FIG. 4. At 500, wireless device 410 searches for legacy devices such as remote device 400. A legacy device is any device incapable of communicating directly with network 430. For example remote device 400 may only support a Bluetooth scheme, while network 430 may be a Wi-Fi network which may only support communication via the IEEE 802.11 standard. At 505, wireless device 410 identifies remote device 400 and then establishes communication via communications link 420. For example, wireless device 410 may require approval by its user or owner in order to establish a connection with remote device 400. Alternatively, wireless device may be configured to automatically connect to remote device 400 based on a predetermined setting or previous communication sessions with remote device 400 or the like.

At 510, remote device 400 sends, and wireless device 410 receives, registration information of remote device 400. For example, the registration information can be identification information for remote device 400. The registration information can also include the capabilities of remote device 400 such as displaying pictures or video, printing materials, processing data, detecting stimuli, storing content, available resources or the like. The registration information may also include content or other data stored on remote device 400.

At 515, wireless device 410 determines if remote device 400 is registered with CGW 440. Wireless device 410 may contact CGW via communications link 422 and/or network 430. Wireless device may query CGW 440 for a listing of all devices contained on the network. In another embodiment, wireless device 410 may send identification information for remote device 400 to CGW 440 which may then determine if remote device 400 is already registered. If it is determined that remote device 400 is already registered with CGW 440, then at 530 the wireless device can query CGW 440 to determine if there is content available for remote device 400 or if there is a request for content located on remote device 400. If it is determined that remote device 400 is not registered with CGW 440, then at 520 wireless device 410 sends CGW 440 the registration information it received from remote device 400 at 510.

At 525, CGW 440 receives the registration information from wireless device 410, and proceeds to add remote device 400 to a listing of available devices. CGW 440 may also alert network devices 450 that remote device 400 has been added to the listing, and/or that remote device 400 may be contacted via wireless device 410. At 530, wireless device 410 may query CGW 440 to determine if there is content available for remote device 400 or if there is a request for content from remote device 400. Embodiments contemplate a network device 450, upon receiving a notification that remote device 400 has content available from CGW 440, may contact wireless device 410 to request the content from remote device 400. Additionally, network device 450 may contact wireless device 410 in order to send content to remote device 400. In still another embodiment, remote device 400, may receive a listing of content available from CGW 440 via wireless device 410, and then request content from a network device 450 via wireless device 410.

Although features and elements are described above in particular combinations, one of ordinary skill in the art will appreciate that each feature or element can be used alone or in any combination with the other features and elements. In addition, the methods described herein may be implemented in a computer program, software, or firmware incorporated in a computer-readable medium for execution by a computer or processor. Examples of computer-readable media include electronic signals (transmitted over wired or wireless connections) and computer-readable storage media. Examples of computer-readable storage media include, but are not limited to, a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs). A processor in association with software may be used to implement a radio frequency transceiver for use in a WTRU, UE, terminal, base station, RNC, or any host computer.

What is claimed:
1. A method performed by a wireless transmit/receive unit (WTRU) of collecting data from a previously unknown source and providing the data to a recipient, the method comprising:
detecting an indication from a remote device that data on the remote device is available for transfer from the remote device;
discovering the remote device after the detection of the indication from the remote device, the data being acquired by the remote device via a sensor, and the remote device being undiscovered prior to the detection of the indication, the remote device having a limited range wireless communication capability and the WTRU having the limited range wireless communication capability and an advanced range wireless com- munication capability and a subscription for the receipt of the data from the remote device;

receiving the data from the remote device after the discovery of the remote device, the data including at least one of: an identification of the remote device or an identification of the sensor;

identifying a server based at least in part on the identification of the remote device or the identification of the sensor; and sending the received data to the server from the WTRU.

2. The method of claim 1, wherein the sensor is in operable communication with the remote device.

3. The method of claim 1, wherein the server is incapable of communicating directly with the remote device.

4. The method of claim 1, further comprising:
storing the received data for a period of time.

5. The method of claim 4, wherein the period of time depends, at least in part, on at least one of a cost, security, or bandwidth of sending the received data to the server.

6. The method of claim 4, wherein sending the received data to the server is unachievable at a first time that the at least part of the data is received from the remote device, the sending the received data to the server becoming achievable at a second time subsequent to the first time.

7. The method of claim 1, wherein the limited range wireless communication capability utilizes Bluetooth.

8. The method of claim 1, wherein the advanced range wireless communication capability utilizes a cellular data network or a Short Messaging Service (SMS).

9. The method of claim 1, wherein the WTRU provides the remote device with an indication that the data has been received.

10. The method of claim 1, further comprising at least one of:
receiving an acknowledgement from the server upon receipt of the received data; or notifying the user that the received data has been received by the server.

11. A device, the device being a wireless transmit/receive unit (WTRU), the WTRU comprising a processor, the processor configured at least in part to:

detect an indication from the remote device that data on the remote device is available for transfer from the remote device;

discover the remote device after the detection of the indication from the remote device, the data being acquired by the remote device via a sensor, and the remote device being undiscovered prior to the detection of the indication, the remote device having a limited range wireless communication capability and the WTRU having the limited range wireless communication capability and an advanced range wireless communication capability and a subscription for the receipt of the data from the remote device;

receive the data from the remote device after the discovery of the remote device, the data including at least one of: an identification of the remote device or an identification of the sensor;

identify a server based at least in part on the identification of the remote device or the identification of the sensor; and send the received data to the server.

12. The device of claim 11, wherein the sensor is in operable communication with the remote device.

13. The device of claim 12, further comprising:
a memory for storing the received data for a period of time.

14. The device of claim 13, wherein sending the received data to the server is unachievable at a first time that the at least part of the data is received from the remote device, the sending the received data to the server becoming achievable at a second time subsequent to the first time.

15. The device of claim 11, wherein the server is incapable of communicating directly with the remote device.

16. The device of claim 11, wherein the limited range wireless communication capability utilizes Bluetooth.

17. The device of claim 11, wherein the advanced range wireless communication capability utilizes a cellular data scheme or Short Messaging Service (SMS).

18. The device of claim 11, wherein the processor is further configured to provide the remote device with an indication that the data has been received.

19. The device of claim 11, further comprising:
a display for notifying a user that the at least part of the data has been received from the remote device or that the received data has been received by the server.

* * * * *